United States Patent [19]

Smith

[11] Patent Number: 4,959,826
[45] Date of Patent: Sep. 25, 1990

[54] SPREAD SPECTRUM OPTICAL COMMUNICATION SYSTEM WITH HETERODYNE DETECTION

[75] Inventor: David W. Smith, Woodbridge, England

[73] Assignee: British Telecommunications public limited company, United Kingdom

[21] Appl. No.: 159,368
[22] PCT Filed: Jun. 26, 1987
[86] PCT No.: PCT/GB87/00449
 § 371 Date: Feb. 29, 1988
 § 102(e) Date: Feb. 29, 1988
[87] PCT Pub. No.: WO88/00415
 PCT Pub. Date: Jan. 14, 1988

[30] Foreign Application Priority Data

Jul. 1, 1986 [GB] United Kingdom ................ 8616050

[51] Int. Cl.$^5$ ............................................. H04J 14/00
[52] U.S. Cl. ........................................ 370/1; 455/619
[58] Field of Search ............... 455/605, 606, 607, 612, 455/615, 616, 617, 619, 618; 370/2, 3, 4; 375/1

[56] References Cited

U.S. PATENT DOCUMENTS

| | | | |
|---|---|---|---|
| 4,335,463 | 6/1982 | Foucard | 455/608 |
| 4,390,247 | 6/1983 | Freye | 350/358 |
| 4,644,267 | 2/1987 | Tsui | 350/356 |
| 4,666,295 | 5/1987 | Duvall | 350/356 |
| 4,742,576 | 5/1988 | McMahon | 455/612 |
| 4,748,686 | 5/1988 | Glomb | 455/612 |

FOREIGN PATENT DOCUMENTS 0157692 10/1985 European Pat. Off. .
0168192 1/1986 European Pat. Off. .

OTHER PUBLICATIONS

Journal of Lightwave Technology, vol. LT-3, No. 5, Oct. 1985 (New York, U.S.), L. L. Brooks et al; "Coherence Multiplexing of Fiberoptic Interferometric Sensors", pp. 1062–1071, see p. 1062.

Primary Examiner—Donnie L. Crosland
Assistant Examiner—L. Van Beek
Attorney, Agent, or Firm—Nixon & Vanderhye

[57] ABSTRACT

A broad spectrum optical carrier from a source is divided over at least two paths and the carrier in at least one path is modulated in accordance with information. The paths are recombined with delay multiplexing. At a distribution point, the recombined paths are divided and the modulated carrier in at least one of the paths is combined in heterodyne detection with a local oscillator signal having a frequency shifted with respect to the carrier. The local oscillator signal is delayed prior to combination by a delay corresponding to a delay of the delay multiplexing.

21 Claims, 3 Drawing Sheets

SPREAD SPECTRUM OPTICAL COMMUNICATION SYSTEM WITH HETERODYNE DETECTION

BACKGROUND OF THE INVENTION

1. Field of the Invention

This invention relates to optical transmission systems and especially to multiple-access systems.

2. Description of Related Art

Transmitting a large number of channels of information over a given link requires the signals to be separable at the receiving end. This may be achieved by dividing the available band into disjoint slots for each user or by permitting each user to occupy the entire band and rendering the various transmitted signals orthogonal in some way so that the signals will not interfere with one another.

This latter spread spectrum technique has received attention particularly with radio frequency transmission. Proposals for utilising spread spectrum techniques in optical systems have been made, involving the generation of pseudo-random electrical signals which are modulated with information to be transmitted and then applied to an optical source such as a laser. The different channels are then code division multiplexed. Unfortunately both the generation of pseudo-random signals and code multiplexing are complex techniques.

If the coherence time of an optical signal is relatively short then the channels can be multiplexed by imposing a time delay greater than the coherence time. A scheme has been proposed for optical transmission systems in which the signal from a short coherence interval source is split into several components. Each component is then divided in two and one part modulated and one part delayed. These parts are recombined with the other components which have been split and provided with different modulations and delays, and transmitted. At the receiving end the combined signal is re-divided, each division split into two and one part delayed, and the parts then recombined so that equally delayed parts of the modulated and unmodulated signal are combined and detected. The disadvantage of this system is that there are high losses at the detection stage; half of the modulated signal and half of the unmodulated signal are lost. The associated direct detection techniques are also high in losses.

SUMMARY OF THE INVENTION

The present invention is directed towards providing a more efficient optical spread spectrum system.

According to a first aspect of the invention there is provided a method of transmitting information using a broad spectrum optical carrier signal, comprising dividing the carrier signal over at least two paths, modulating the carrier signal in at least one of the paths in accordance with information and recombining the divided signals with delay multiplexing, and receiving the information by combining a portion of the recombined signal in heterodyne detection with a local oscillator signal having a frequency shifted with respect to the carrier, and in which the local oscillator signal is delayed prior to combination by a delay corresponding to a delay of the delay multiplexing.

The local oscillator signal must have the same spread spectrum characteristics as the optical carrier. The local oscillator signal may be generated remotely at a receiver or distribution point, or may consist of a signal divided from the carrier and transmitted along a separate path or multiplexed onto the same path as the recombined modulated paths. Preferably the local oscillator signal is divided from the carrier signal and is subject to a frequency shift. The frequency shift is conveniently imposed prior to transmission in order to keep most of the active components at the transmitter. Preferably the local oscillator is polarisation multiplexed for transmission.

The paths preferably comprise optical waveguides, such as, for example, optical fibres.

In a preferred embodiment of the invention a return message is transmitted by mixing the divided and recombined signals and the local oscillator signal to provide a return message carrier signal and the return message carrier signal is divided over two paths one of which is modulated in accordance with a return message and then recombined with the other return message path with delay multiplexing.

A second aspect of the invention provides a method of transmitting information using a spread spectrum optical carrier comprising dividing the carrier over a plurality of paths, frequency shifting the carrier in one of the paths to form a local oscillator signal, generating an information signal by modulating the signal in at least one of the remaining paths and applying a delay that differs for each of said remaining paths, recombining at least said remaining paths to provide a recombined signal and transmitting the recombined signal and the local oscillator signal.

The modulation imposed is preferably angle modulation.

Implementing the method of the invention in its various aspects, the present invention further provides an optical transmission system using a broad spectrum optical carrier and adapted for coherent detection comprising means for generating a multi-channel delay multiplexed carrier signal wherein at least one channel is information modulated and further comprising means for selecting a channel at a receiver by delay tuning a local oscillator signal.

BRIEF DESCRIPTION OF THE DRAWINGS

Aspects of the invention will now be described in detail and by way of example with reference to the accompanying drawings, in which.

DETAILED DESCRIPTION OF EXEMPLARY EMBODIMENTS

Figure 1:
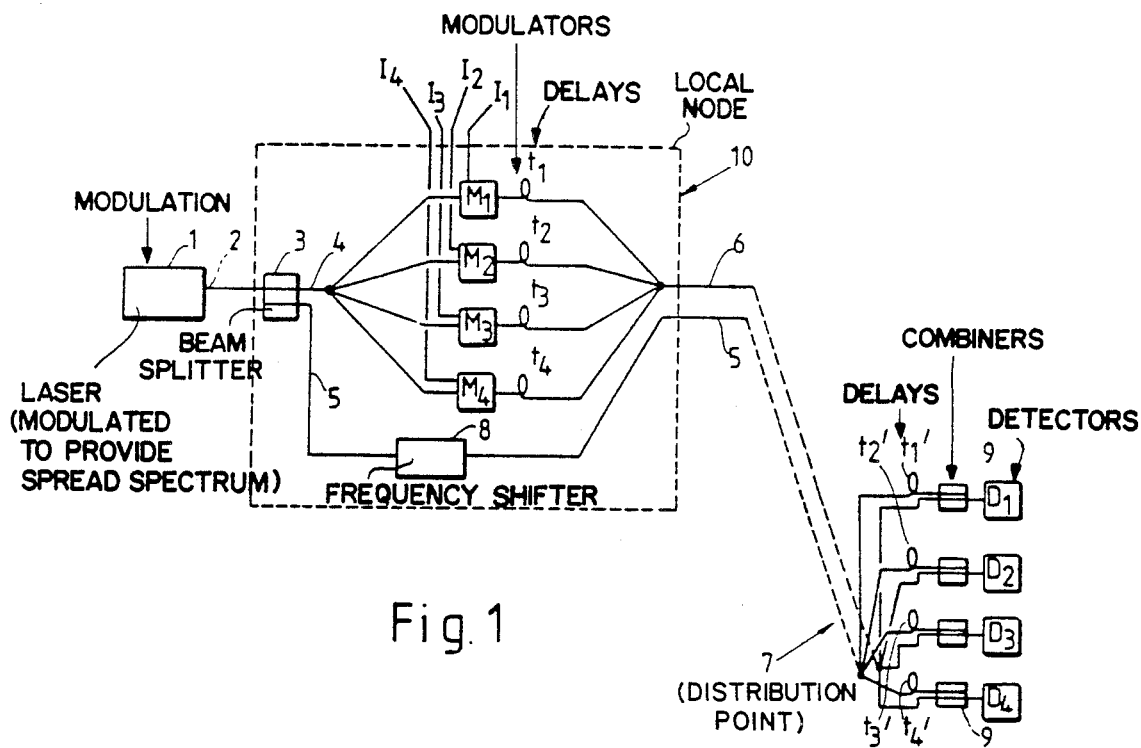
FIG. 1 illustrates a basic configuration of a transmission system according to the invention.

The principle of operation of the system will be described with reference to FIG. 1 which shows a basic configuration. A single laser source 1 is frequency modulated to provide a spread spectrum signal on line 2 to a local node referenced 10. In the node the signal on line 2 is fed to a beam splitter 3 which provides two output signals on lines 4 and 5. On line 4 the signal is further split and shared n ways along n component paths. Each component path is coupled to a different modulator $M_1$, $M_2$ ... $M_n$ (in the Figure n=4), which may conveniently be a lithium niobate phase modulator, and which modulates the respective component signal in accordance with respective input signals $I_1$, $I_2$ ... $I_n$. The modulators are each connected to a delay line $t_1$, $t_2$ ... $t_n$, each delay line having a different characteristic delay to all the other delay lines. After the delay lines the n modulated, delayed component signals are recombined on transmission line 6. The signal on line 5 passes to a frequency shifter 8 and then continues uncombined to a distribution point referenced 7. The combined modulated signal also passes to the distribution point. At the distribution point the signals on each of the lines 5 and 6 are split n ways and paired, one of each pair being from line 5 and one from line 6. The paired signals then pass to different detectors $D_1$ to $D_n$. Each detector has an associated delay $t_1'$, $t_2'$ ... $t_n'$ which corresponds to the delay associated with the modulator from which the signal is to be detected, and the signal split from line 5 passes via this delay before being input, along with the signal split from line 6, into a combiner 9 where they are paired for heterodyne detection.

The channel interpreted by the detector will depend upon the delay imposed in its associated delay line. Thus each receiver terminal can be assigned a separate channel by choice of a specific delay corresponding to the transmitter delay, or a terminal may be tunable by having a variable delay.

To provide a suitable spread spectrum source signal to the node 10, a variety of different waveforms may be used to modulate the frequency of the source 1. One particularly suitable source modulation comprises a triangular or saw-tooth waveform. This reduces the number of spurious interfering signals produced in the demodulation process. An alternative modulation comprises a sinusoidal oscillation close to or at the relaxation oscillation frequency of the laser source, thereby maximising the available 'chirp'.

As an alternate to direct FM of a laser, a fixed frequency laser could be used in combination with a separate modulator. The modulator could be driven by a m-sequence generator.

Alternatively a naturally broad linewidth laser source could be used, thereby eliminating the need for imposed frequency modulation although this may then require greater precision in matching the delay lines between transmitter and receiver. Suitable delays can be imposed by short lengths of monomode optical fibre. The delay at the transmission end may of course be applied before rather than after modulation.

The embodiment described with reference to FIG. 1 requires two optical fibre paths (5 and 6) from the transmitter to the distribution point 7. It is necessary to control the polarisation of the signals for the heterodyne detection. It is desirable to avoid using polarisation holding fibre for this purpose. Therefore, active polarisation control, polarisation modulator or polarisation diversity reception is generally required. A polarisation feedback control (eg as described with reference to FIG. 3 below) may be provided by splitting an extra channel from the lines 5 and 6 at the distribution point. Preferably the active parts of such a polarisation control are retained at the node 10 and the control signal is transmitted along one of the fibres 5 or 6 in the return direction.

Figure 2:
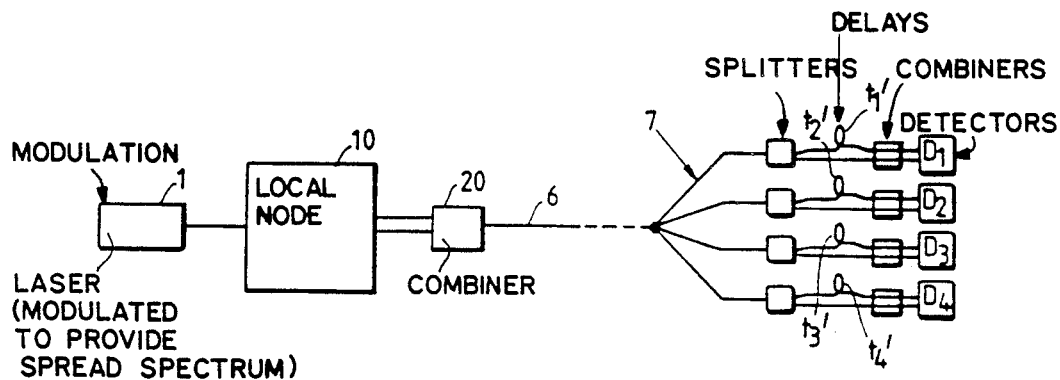
FIGS. 2 3 and 5 illustrate examples of alternative embodiments.

FIG. 2 shows an alternative embodiment in which a single fibre is used for the transmission of the local oscillator signal and the delay multiplexed modulated signals. In this embodiment polarisation holding fibre is used up to a final combiner 20, after which it can be presumed that the polarisations of the various signals will vary in a similar manner. The local oscillator signal arrives at the distribution point delay multiplexed from the other signals (and also frequency shifted). In order to detect the different information signals the signal on line 6 is split N ways, each subdivision then being split again, one part delayed and the parts recombined. However this latter method of detection suffers from additional losses as half of the signal and half of the local oscillator signal is lost.

Figure 3:
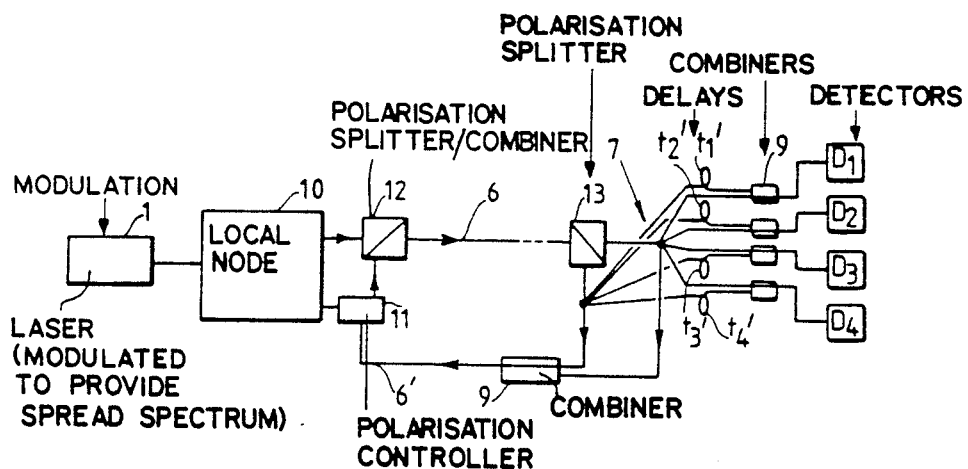

A third embodiment of the invention is shown in FIG. 3 in which the local oscillator signal and the combined delay multiplexed modulated signals are combined for transmission on a single fibre. To maintain a strong local oscillator signal to enable separation at the distribution point, the local oscillator signal is polarisation multiplexed on to the common transmission fibre. Non-polarisation holding fibre is employed and a polarisation control is present in one signal arm prior to the polarisation multiplex to ensure exact orthogonal polarity.

Referring now in more detail to FIG. 3, the local node 10 comprises a beam splitter 3, modulators and delays and local oscillator frequency shifter 8 as in FIG. 1. The local oscillator path 5 also contains a polarisation controller 11, from which the local oscillator signal is input to a polarisation splitter/combiner 12 where it is multiplexed onto the transmission fibre 6 by orthogonal polarisation. At the distribution point 7 a polarisation splitter 13 demultiplexes the local oscillator signal which is then split n+1 ways. The combined modulated signal is similarly split. Of the split local oscillator signals, n are subjected to respective delays and combined in heterodyne detection with n of the split modulated signals as described for the embodiment of FIG. 1. The n+1th split modulated signal is recombined, without further delays, with the n+1th signal split from the local oscillator. This composite signal is fed back to the polarisation controller 11 along the reverse of the outward path 6'. In FIG. 3, the paths 6 and 6' are shown separately for convenience. However, in practice both paths may be provided by a single optical fibre carrying both the outgoing delay multiplexed signals and the returning polarisation control signal.

Figure 4:
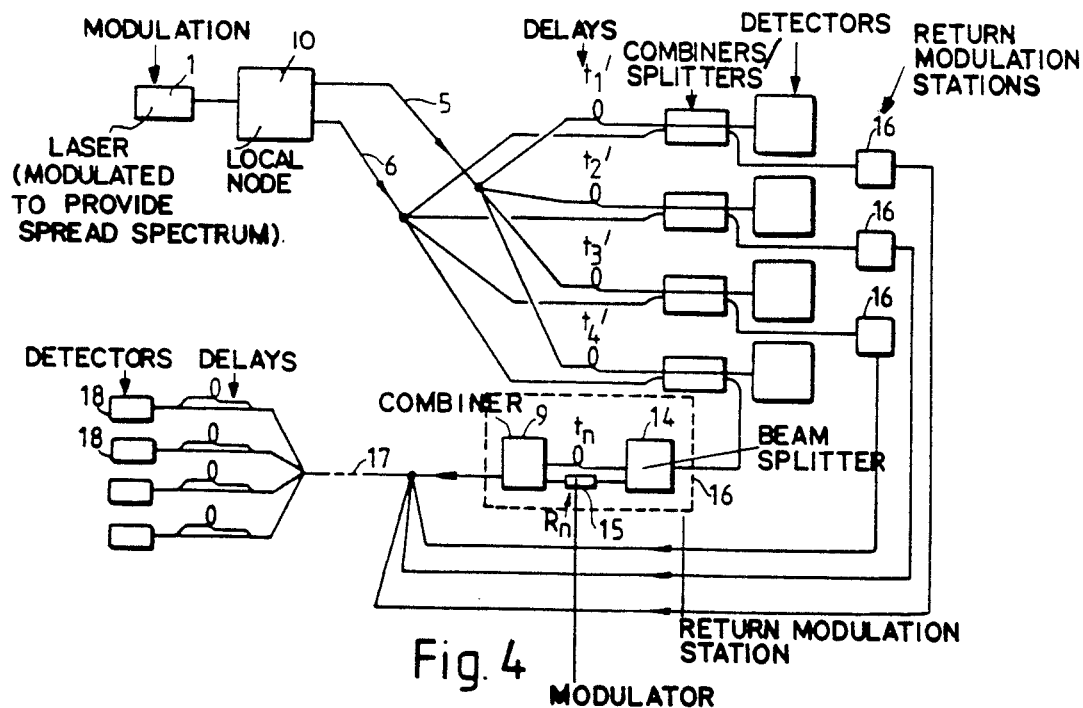
FIG. 4 illustrates a further embodiment of the invention adapted for two-way transmission.

A two-way transmission system can be achieved by utilising a second output from the combiner 9 (which may be a conventional X-coupler, for example) at each receiver as the carrier for the return message. FIG. 4 illustrates such a scheme.

In this embodiment the second output passes to a return modulation station 16 comprising a beam splitter 14, one of the output signals from the splitter 14 being modulated at modulator 15 in response to an input signal (labelled $R_n$) and the other delayed. The signals originally split are then recombined and combined with the signals from the other return modulation stations 16 for transmission along line 17. At the reception end for the return message the combined return signal is split n ways. Each split signal is then split again and one part is appropriately delayed. The split signals are then recombined and input to a direct detector 18. It does not matter on which portion of the split signal the delay $t_n$ is imposed in for the return. It may be in the same path as the modulator 15. The return transmission path is less sensitive than the forward path because there is no heterodyne gain.

It should be noted that various methods could be used to generate the spread spectrum signal. The source may be naturally broad linewidth with a random wavelength output, or a laser source may be swept or modulated. A laser source of fixed wavelength may be modulated by a pseudo-random signal generator. If the laser output and modulation are reproducible the local oscillator signal may be locally produced at the receiver rather than transmitted: the use of fixed frequency lasers and a maximal-sequence generator would readily adapt to local generation.

Figure 5:
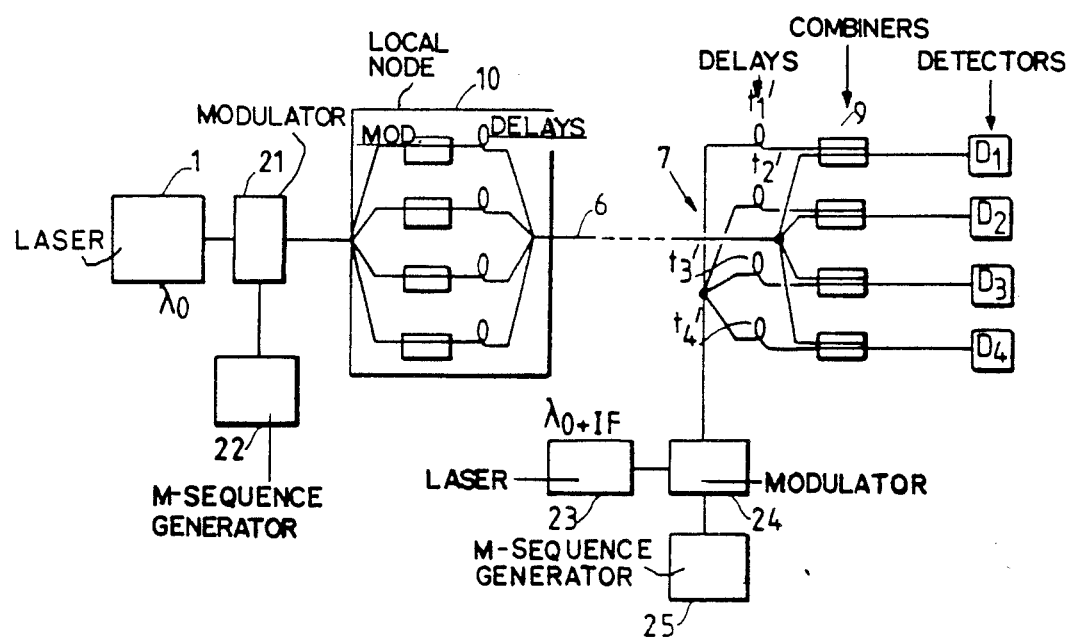

A system of this form is illustrated in FIG. 5. In this case, the signal from the source 1 is modulated in a modulator 21 under the control of an m-sequence generator 22 before passing to the node 10. In this embodiment the frequency shifter is omitted from the node 10. At the remote distribution point, local oscillator signals are provided from a second source 23, frequency shifted with respect to the primary source 1, via a further modulator 24 controlled by a second m-sequence generator 25 which is locked in phase with the primary generator 22.

Some projected network parameters will now be discussed with reference to the distribution network of the form shown in FIG. 1.

A launch power of +3 dB from the common source is assumed. For 140 Mbit/s operation the best measured PSK heterodyne receiver sensitivity is −59 dBm for a local oscillator power of −23 dBm (the theoretical figure for unlimited local oscillator power is −63 dBm). The launch power is split between the signal path and the local oscillator path. The signal path is split N ways with an excess loss of, say, 2 dB for N of 1 to 20. Each signal is modulated by a phase modulator with total fibre to fibre loss of, say, 3 dB. All the outputs from the modulators are recombined with a loss of 10 log N+2 dB. The transmission loss of the network may be assumed to be 5 dB. The loss at the distributor may be taken as 10 log N+2 dB. A 3 dB loss is assumed for recombining signal and local oscillator fields prior to photodetection. In the local oscillator path the budgeted losses include 3 dB through the acoustic optic frequency shifter and a further 3 dB through a polarisation controller (when used). The remaining transmission and distribution losses for the local oscillator path will be similar to the signal path.

Although PSK is more demanding on laser linewidth than ASK for conventional heterodyne detection this should not be as significant in embodiments of the invention when both the modulation signal and local oscillator are derived from a common source and reasonable care is taken to match the delays between the two paths before recombination.

For the above parameters a network size of 20×140 Mbit/s to 20 terminals would represent an upper limit from power budget considerations.

Another constraint that could limit network size is the maximum FM deviation of the source laser. Taking a instantaneous channel spacing of about 5×IF bandwidth and by assuming an IF bandwidth of 2×bitrate a total optical frequency sweep of about 28 GHz is required for the 20 channel scheme. This degree of current controlled frequency chirp has been reported by several groups working with DFB lasers.

The frequency of modulation used will determine the length of the fibre delays needed. For a modulation rate of 1 MHz the maximum fibre delays will be about 100 meters. This length may be considered a little unwieldy. To considerably reduce the delay paths necessary it is proposed that GHz sweep frequencies could be used. This may be achieved by driving the source laser at its relaxation frequency, say 1 to 2 GHz. Although this would result not only in wide deviation frequency modulation but also in some unwanted amplitude modulation, the AM signal should be outband of the receivers' IF.

Analogue transmission could also be used.

The network can be extended by the inclusion of broadband travelling wave laser amplifiers at strategic points in both the signal and local oscillator paths. It may also be possible to share a single swept laser source between an unlimited number of primary distribution fibers by the use of high power laser amplifiers. The network can further be extended by combining many coherent spread spectrum systems with conventional wavelength multiplexing techniques. The ultimate capacity of such a distribution network may only be limited by the intrinsic fibre transmission bandwidth.

The present invention provides a new local distribution network scheme and transmission system which offers the performance of coherent transmission using a heterodyne spread spectrum concept. The demands on component resources of this new network are particularly lean; a single DFB laser source could be shared by up to 20 channels; no laser frequency locking schemes are required; and no narrowband optical filters are needed to realise the basic network. Channel selection is achieved using only matched optical delays (the need for accurate matching of the phase delays is eliminated by using heterodyne detection rather than homodyne detection) and for moderate data rates (140 Mbit/s) the terminal receiver can be of the standard PINFET type. The system can be readily extended by the application of conventional WDM techniques and also by the use of laser amplifiers. Although primarily considered as a wideband signal distribution network, the system can be reconfigured to provide a lower capacity return channel without the need for an individual light source at each terminal.

I claim:

1. A method of transmitting information using a broad spectrum optical carrier signal source, said method comprising:
    dividing the carrier signal over at least two paths,
    modulating the carrier signal in at least a first one of the paths in accordance with information and recombining the divided signals with delay multiplexing onto a common path, and
    receiving the information by combining a portion of the recombined signal from said common path in heterodyne detection with a local oscillator signal having a frequency shifted with respect to the carrier, and in which the local oscillator signal is delayed prior to combination by a delay corresponding to a delay of the delay multiplexing.

2. A method according to claim 1 wherein said receiving step includes the step of generating the local oscillator signal from a source other than that used to provide the carrier signal.

3. A method according to claim 1 wherein said receiving step includes the step of generating the local oscillator signal by frequency shift of a signal divided from the carrier.

4. A method according to claim 3 wherein said modulating step includes the step of polarisation multiplexing the local oscillator signal onto said common path with the recombined delay multiplexed signal.

5. A method according to any preceding claim 1, 2, 3 or 4 in which said receiving step includes the step of mixing a portion of the recombined signal from said common path and a portion of the local oscillator signal to provide a return message carrier signal, and dividing the return message carrier signal over two paths one of which is modulated in accordance with a return message and recombined with the other return message path with delay multiplexing.

6. A method of transmitting information using a spread spectrum optical carrier source, said method comprising:
dividing the carrier over a plurality of paths comprising a first path and remaining paths,
frequency shifting the carrier in one of the paths to form a local oscillator signal,
generating an information signal by modulating the signal in at least one of the remaining paths and applying a delay that differs for each of said remaining paths,
recombining at least said remaining paths to provide a recombined signal and transmitting the recombined signal and the local oscillator signal.

7. A method according to claim 6 in which the local oscillator signal is combined with the recombined signal from said remaining paths for transmission.

8. A method according to claim 7 in which the local oscillator signal is polarisation multiplexed with respect to the recombined signal.

9. A method according to any preceding claim 6, 7 or 8 in which the broad spectrum optical carrier is generated by modulating a source.

10. A method according to claim 9 in which the carrier is modulated by a triangular waveform.

11. An optical transmission system using a broad spectrum optical carrier source and adapted for coherent detection, said system comprising:
first means for generating a multi-channel delay multiplexed carrier signal having at least one channel information modulated, and
second means optically coupled to said carrier signal for selecting a selected channel at a receiver by selectively effecting a corresponding delay of a local oscillator signal.

12. An optical transmission system according to claim 11 wherein the broad spectrum optical carrier source includes means for modulating the optical source.

13. An optical transmission system according to claim 12 wherein the means for modulating the optical source includes means for effecting a triangular modulation to provide the broad spectrum optical carrier.

14. An optical transmission system according to claim 11 further including:
means coupled to said source for imposing a frequency shift on a portion of the broad spectrum optical carrier to provide said local oscillator signal.

15. An optical transmission system according to claim 14 including means optically coupled to said first means to polarisation multiplex and transmit the local oscillator signal with the delay multiplexed carrier signal.

16. An optical transmission system according to claim 11, 12, 13, 14 or 15 further comprising:
mean optically coupled to said second means and adapted for sending a return message with a portion of the multi-channel delay multiplexed signal and a portion of the local oscillator signal being mixed to provide a return message carrier signal, the return message carrier signal being divided over two paths one of which is modulated in accordance with a return message and recombined with the other return message path with delay multiplexing.

17. A spread spectrum optical communication system having n delay-multiplexed information bearing channels, said system comprising:
a laser;
means for frequency modulating said laser to provide a spread frequency spectrum optical carrier signal;
divider means for dividing said spread spectrum optical signal into at least n+1 optical paths;
n information signal sources;
means for modulating with a respective information source, delay-multiplexing and recombining optical signals passing over each of n of said n+1 paths for transmission over a common optical signal transmission path, said n paths corresponding to said n channels; and
means located at a remote distribution point optically coupled to said common optical signal transmission path for splitting it into at least n optical paths and, delay-demultiplexing and heterodyne detecting n resespectively corresponding optical signal information bearing channels using a local optical oscillator signal in each such channel having its frequency shifted with respect to that of said carrier signal and being delayed by the demultiplexing delay for its corresponding channel.

18. A system as in claim 17 further comprising:
an optical polarisation feedback control means extending between said remote distribution point and said means for recombining for actively controlling the polarisation of optical signals being transmitted toward said remote distribution point over said common optical signal transmission path.

19. A system as in claim 17 wherein said means for heterodyne detecting includes an optical signal combiner/splitter in m of said n paths and further comprising:
return message means located at said remote distribution point and coupled to an optical signal combiner/splitter at each of m said heterodyne detectors for providing m split-off carriers and further including:
means for delay multiplexing and modulating each of said m split-off carriers with a respective source of return information; and
means for combining said m modulated split-off carriers into a common return optical signal transmission path leading away from said remote distribution point.

20. A broad spectrum optical communication system having n delay-multiplexed information bearing channels, said system comprising:
a broad spectrum optical carrier signal source;
divider means for dividing said broad spectrum optical signal into at least n+1 optical paths;
n information signal sources,
means for modulating with a respective information source, delay-multiplexing and recombining optical signals passing over each of n of said n+1 paths for transmission over a common optical signal transmission path, said n paths corresponding to said n channels;
means located at a remote distribution point optically coupled to said common optical signal transmission path for splitting it into at least n optical paths, delay-demultiplexing and heterodyne detecting n respectively corresponding optical signal information bearing channels using a local optical oscillator signal in each such channel having its frequency shifted with respect to that of said carrier signal and being delayed by the demultiplexing delay for its corresponding channel; and an optical polarisation feedback control means extending between said remote distribution point and said means for recombining for actively controlling the polarisation of optical signals being transmitted toward said remote distribution point over said common optical signal transmission path.

21. A broad spectrum optical communication system having n delay-multiplexed information bearing channels, said system comprising:
a broad spectrum optical carrier signal source;
divider means for dividing said spread spectrum optical signal into at least n+1 optical paths;
n information signal sources;
means for modulating with a respective information source, delay-multiplexing and recombining optical signals passing over each of n of said n+1 paths for transmission over a common optical signal transmission path, said n paths corresponding to said n channels, means located at a remote distribution point optically coupled to said common optical signal transmission path for splitting it into at least n optical paths, delay-demultiplexing and heterodyne detecting n respectively cooresponding optical signal information bearing channels using a local optical oscillator signal in each such channel having its frequency shifted with respect to that of said carrier signal and being delayed by the demultiplexing delay for its corresponding channel;

said means for heterodyne detecting including an optical signal combiner/splitter in m of said m paths; and return message means located at said remote distribution point and coupled to an optical signal combiner/splitter at each of m said heterodyne detectors for providing m split-off carriers and further including:
means for delay multiplexing and modulating each of said m split-off carriers with a respective source of return information; and
means for combining said m modulated split-off carriers into a common return optical signal transmission path leading away from said remote distribution point.

* * * * *